United States Patent
Schiele

(10) Patent No.: US 12,448,252 B2
(45) Date of Patent: Oct. 21, 2025

(54) HOISTING ARRANGEMENT FOR ASSEMBLY OF WIND TURBINES

(71) Applicant: DELTA LABORATORIES HOLDING B.V., Rotterdam (NL)

(72) Inventor: André Schiele, Warmond (NL)

(73) Assignee: DELTA LABORATORIES HOLDING B.V., Rotterdam (NL)

( * ) Notice: Subject to any disclaimer, the term of this patent is extended or adjusted under 35 U.S.C. 154(b) by 507 days.

(21) Appl. No.: 17/623,724

(22) PCT Filed: Jul. 1, 2020

(86) PCT No.: PCT/NL2020/050434
§ 371 (c)(1),
(2) Date: Dec. 29, 2021

(87) PCT Pub. No.: WO2021/002749
PCT Pub. Date: Jan. 7, 2021

(65) Prior Publication Data
US 2022/0259013 A1   Aug. 18, 2022

(30) Foreign Application Priority Data
Jul. 1, 2019   (NL) .................................... 2023415

(51) Int. Cl.
*B66C 1/10*   (2006.01)
*B66C 13/08*   (2006.01)
(Continued)

(52) U.S. Cl.
CPC .............. *B66C 1/108* (2013.01); *B66C 13/08* (2013.01); *B66C 23/185* (2013.01); *B66C 23/52* (2013.01); *B66C 2700/0321* (2013.01)

(58) Field of Classification Search
CPC ........ B66C 23/185; B66C 23/52; B66C 1/108
See application file for complete search history.

(56) References Cited

U.S. PATENT DOCUMENTS 3,567,040 A    3/1971  Thomson
7,367,464 B1 *  5/2008  Agostini .............. B66C 13/063
                                                     212/308
(Continued)

FOREIGN PATENT DOCUMENTS

CN   102976200 B   12/2014
CN   106744320 A   5/2017
(Continued)

OTHER PUBLICATIONS

Communication pursuant to Rule 114(2) EPC for corresponding European application No. 20737301.0; dated Mar. 28, 2023 (3 pages).
(Continued)

*Primary Examiner* — Anna M Momper
*Assistant Examiner* — Juan J Campos, Jr.
(74) *Attorney, Agent, or Firm* — MENDELSOHN DUNLEAVY P.C.; Kevin J. Dunleavy

(57) ABSTRACT

A hoisting arrangement for hoisting an offshore wind turbine blade, comprising a gripper attachment 150 arranged to be connected to the wind turbine blade, comprising a set of cable attachment points 191, 192,193 arranged as a first polygon, a vessel attachment module 194 arranged to be connected to a vessel, comprising a plurality of cable guide elements 190 arranged as a second polygon, a plurality of cables 141, 142, 143, 144 spanned between the cable attachment points and the cable guide elements, and a control system for controlling a position and/or orientation of the gripper attachment within a work space by controlling a spanned length of at least two cables of the plurality of cables between the cable attachment points and the cable guide elements.

23 Claims, 9 Drawing Sheets

(51) Int. Cl.
*B66C 23/18* (2006.01)
*B66C 23/52* (2006.01)

(56) References Cited

U.S. PATENT DOCUMENTS

| | | | |
|---|---|---|---|
| 9,908,750 B2* | 3/2018 | Sturm, Jr. | ............ B66C 11/08 |
| 2013/0126457 A1* | 5/2013 | Sturm, Jr. | ............ B66C 13/08 |
| | | | 212/318 |
| 2015/0203337 A1* | 7/2015 | Roodenburg | ......... B63B 27/10 |
| | | | 212/309 |

FOREIGN PATENT DOCUMENTS

| CN | 109553005 A | 4/2019 |
|---|---|---|
| CN | 108466931 B | 8/2019 |
| WO | 2006052907 A2 | 5/2006 |
| WO | 2011123816 A2 | 10/2011 |
| WO | 2019156556 A1 | 8/2019 |

OTHER PUBLICATIONS

International Search Report and Written Opinion for corresponding International application No. PCT/NL2020/050434; dated Sep. 11, 2020 (9 pages).

* cited by examiner

HOISTING ARRANGEMENT FOR ASSEMBLY OF WIND TURBINES

FIELD OF THE INVENTION

The invention relates to the field of hoisting arrangements for hoisting offshore wind turbine blades.

BACKGROUND

Installing offshore wind turbines is a complicated matter. For one, components such as the nacelle and the turbine blades have to be lifted of the deck of an installation vessel by a crane up to large heights, for example up to 150 metres or higher. Furthermore, the components have to be assembled at that height with high precision whilst being suspended from the crane.

The installation may be made even more difficult by the environmental conditions off-shore, such as by winds and waves which may exert disturbance motions on the installation vessel and/or on the components that are suspended in the air and being lifted by the crane.

For decoupling the installation vessel from the influence of currents, and waves, a jack-up vessel may be used. However, jack-up vessels have a limited working area and limited usability in different waters, due to the limitation in the height of the jack-up legs on which the vessel can be lifted. Furthermore, the lifting of the legs may be a time consuming process and finding suitable jack-up position next to a turbine might also be a challenge and depends on suitability of the ocean floor.

Although the effect of the waves and wind on the installation vessel may be limited by jacking the vessel up, wind forces on all elements may still move the components suspended from the crane.

As an alternative to a jack-up vessel and conventional crane, a motion compensating crane may be used. Such a crane is arranged to keep the load suspending from it on substantially the same position while the base of the crane moves with the vessels movements caused by winds and waves because it is rigidly attached to the vessel for at least some degrees of freedom. However, such motion compensating cranes may be heavy, require a lot of energy to operate, and/or have a limited working range, especially on the vertical range.

SUMMARY

It is preferred to provide a hoisting arrangement for hoisting components, such as offshore wind turbine blades, which may be lighter and thus require less energy to operate. It may also be preferred to provide a hoisting arrangement with which faster motion compensation is possible. It may be preferred to provide a hoisting arrangement with which larger vertical distances can be covered.

A first aspect provides a hoisting arrangement for hoisting an offshore wind turbine blade, comprising a gripper attachment arranged to be connected to the wind turbine blade, comprising a set of cable attachment points arranged as a first polygon, a vessel attachment module arranged to be connected to a vessel, comprising a plurality of cable guide elements arranged as a second polygon, a plurality of cables spanned between the cable attachment points and the cable guide elements, and a control system for controlling a position and/or orientation of the gripper attachment within a work space by controlling a spanned length of at least two cables of the plurality of cables between the cable attachment points and the cable guide elements. Preferably, the spanned length of at least four cables, or more preferably of all cables of the plurality of cables can be controlled.

The gripper attachment is arranged to be connected to a component that is to be hoisted, for example the wind turbine blade. This connection preferably is rigid. The connection may be a direct connection. Alternatively, one or more additional components such as a gripper may be provided between the gripper attachment and the component that is to be hoisted. Such a gripper may allow more easy connection between the gripper attachment on the one hand and different hoistable components on the other hand.

The vessel attachment module is arranged to be connected to the vessel. This connection may be rigid, or may have one or more degrees of freedom. In the latter case, one or more actuators, springs and/or dampers may be provided for controlling the one or more degrees of freedom. The connection between the vessel and the vessel attachment module may be at a single point on the vessel, to a single component (such as the deck or crane) of the vessel, to a plurality of points of the vessel, to a plurality of components, or between any combination thereof. The connection between the vessel attachment module and the vessel may be accomplished using bolts, welding, any other connection method, or any combination thereof.

A cable guide element may be embodied as a pulley, sheave, winch, or any other element along which a cable may be guided and/or on which a cable or part thereof may be wound and/or unwound. A cable guide element may thus provide a fixed position for the cable to be spanned from.

A polygon as a geometric shape may be defined as plane defined by three or more points. Such a plane may be for example shaped as a triangle, square, rectangle, pentagram, or any other planar shape, which does not need to be symmetrical. Included in the definition of a polygon may be skew polygons, which are polygons whose vertices are not all coplanar.

By, preferably co-ordinately, controlling a spanned length of at least two cables of the plurality of cables between the cable attachment points and the cable guide elements, a position and/or orientation of the gripper attachment may be manipulated. For the manipulation, a relatively low amount of energy may be required as the mass of the cables is relatively low. Furthermore, the moment of inertia of any cable guide element and/or winch which is to be rotated for controlling the spanned length of a cable may be relatively low.

Relatively low may be compared to conventional motion compensated cranes, where the components of the crane that need to be moved for the motion compensation may be significantly heavier, thus requiring more energy to be moved. With the lower amount of energy required for controlling the position and/or orientation of the gripper attachment, the control may be faster and as such a smaller deviation from a desired setpoint may be achieved. Moreover, with the lower amount of energy, larger and heavier suspended loads may be controlled in position and/or orientation.

The position of the gripper attachment may be expressed as a three-dimensional coordinate in a Cartesian coordinate system comprising three orthogonal translational axes. The orientation of the gripper attachment may be expressed as a set of three angles, which angles refer to an amount of degrees of rotation around a translation axis.

The hoisting arrangement may be used in offshore application, but also in on shore application. Examples of such on shore applications are the construction of on shore wind turbines, construction work, or any other application which requires hoisting of a mass.

Turbine blades are a mere example of a component which may be hoisted using the hoisting arrangement according to the first aspect. The hoisting arrangement may be further arranged for hoisting other wind turbine components, such as a nacelle, gear box, turbine, any other component, or any other mass that is to be lifted, or any combination thereof.

The term vessel may refer to a floating vessel, such as a boat, ship or pontoon, but may also refer to a land based vehicle such as a truck or movable crane and may even also refer to a stationary crane.

The cables may be connected such that a first cable connected to a first cable attachment is connected to a first cable guiding element, a second cable connected to the first cable attachment is connected to a second cable guiding element, a third cable connected to a third cable guiding element is connected to a second cable attachment point and a fourth cable connected to the third cable guiding element is connected to a third cable attachment point.

In an embodiment, the vessel attachment module comprises a base comprising a boom attachment module as a vessel attachment module arranged to connect the base to a boom of a crane as part of the vessel, and a plurality of arms extending from the base, wherein the arms are at a proximal end connected to the base, wherein at least some of the cable guide elements are provided at distal ends of the arms. The distal ends of the arms and the base may define a pyramid.

A pyramid as a geometric shape comprises a base surface and a plurality of ribs pointing towards a single point. The base surface may be shaped as a triangle, square, rectangle, or as any other polygon. From each of the vertices of this polygon, ribs extend towards a single point, which lies outside the plane of the base surface. Hence, the pyramid has a non-zero volume. The base surface and the ribs together form the pyramid shape. In case of the hoisting arrangement, the distal ends of the arms may form the base surface of the pyramid, and imaginary ribs point from the distal ends towards the base of the hoisting arrangement. The ribs and/or the vertices of the pyramid need not to necessarily have the same length or same route. For example may two or more ribs and/or vertices have the same length, while one or more ribs have a different length.

Alternatively, a pyramid may refer to a geometric shape with a zero volume. In such a case, the base surface, which may be shaped as any polygon and the single point lie in the same plane. In such a case, the arms may extend in this same plane as well.

The plurality of cables may comprise a plurality of pairs of cables, wherein each pair of cables is suspended from a distal end of an arm. Using pairs of cables may reduce the required number of arms and/or may increase controllability of the position and/or orientation of the gripper attachment.

When pairs of cables are used, a first cable of a pair of cables may be connected to an cable attachment point corresponding to a first vertex of the gripper attachment, and a second cable of the pair of cables is connected to a cable attachment point of a second vertex of the gripper attachment.

Also in an embodiment without arms, pairs of cables may be employed. For example, pairs of cable guide elements may be provided in pairs next to, nearby and/or adjacent to one another. A pair of cables may comprise two cables, but may also comprise three or more cables.

The plurality of arms may be provided at a constant angular spacing. For example, when the plurality of arms comprises three arms, the arms may be spaced 120 degrees apart, and when the plurality of arms comprises four arms, the arms may be spaced 90 degrees apart.

The plurality of arms may in embodiments comprise two substantially equally sized arms and one arm sized different from the two substantially equally sized arms. The boom attachment module may be arranged to be connected to the boom of the crane such that the boom of the crane and the different sized arm are substantially provided in the same plane.

The two substantially equally shaped arms may be curved such that at their distal end, the arms are oriented substantially perpendicular to the different sized arm.

The boom attachment module may be provided within the pyramid defined by the distal ends of the arms and the base. As such, the hoisting arrangement may be provided, in use, on top of the crane other than being suspended from the crane. This may provide a more rigid connection between crane and hoisting arrangement, and/or allow the crane with the hoisting arrangement to require less volume when provided in a transportation mode—e.g. when the vessel is in movement and the hoisting arrangement is not in use. When the pyramid has zero volume, the boom attachment module is provided in the same plane as the distal ends of the arms and the base.

Embodiments of the hoisting arrangement may be arranged for accommodating an auxiliary cable of the crane, which auxiliary cable is arranged to be suspended from the crane and through the base. As such, a conventional crane may be used for lifting at least part of the weight of the suspended component. The auxiliary cable may be further guided through the gripper attachment and an optional gripper to the hoisted component. As such, the gripper attachment and the optional gripper may be arranged for accommodating the auxiliary cable. The auxiliary cable may then be connected directly to the wind turbine blade as the hoisted component.

The control system may comprise any number of winches on which the cables can be wound and unwound, and a controller arranged to control the winches, preferably in a coordinated way, for manipulating the position and/or orientation of the gripper attachment within the work space. The manipulation of positions and/or orientation of the gripper attachment may be in a de-coupled manner, such as to control each spatial direction independently from another. With the winches, the spanned length of at least two cables of the plurality of cables between the cable attachment points and the cable guide elements may be controlled. The cable guide elements may be the same components as the winches.

One or more of the winches may be provided in or on the base of the hoisting arrangement. One or more of the winches may be provided on the vessel. The winches may be provided outside a pyramid defined by the distal ends of the arms and the base.

One or more force sensors may be comprised by the hoisting arrangement, wherein the force sensors are arranged to provide a sensor signal related to a tension on one or more of the cables, wherein the control system is arranged to receive the sensor signals and to control the winches based on the received signals.

In embodiments, the vessel attachment module is arranged as a frame on a deck of the vessel.

The vessel may comprise a crane arranged to lift the offshore wind turbine blade.

In embodiments, the vessel attachment module may comprises a plurality of arms arranged to be connected to a boom of a crane, and wherein at least part of the plurality of cable guide elements is provided at distal ends of the arms. Hence, a vessel attachment module does not necessarily comprise a base.

As an option, the arms may define a polyhedron with a non-zero volume. The polyhedron may be drawn over lines extending through centrelines of the arms.

As a further option, a first of the arms may be substantially non-parallel to a plane spanned by a second and a third of the arms.

When an arm is not a straight arm but instead is an at least partially curved arm, the plurality of arms define a polyhedron with a non-zero volume.

When the plurality of arms comprises at least three arms, a first of the arms may be at least partially oriented at an angle relative to a plane spanned by a second and a third of the arms.

The hoisting arrangement may comprise a crane comprising a crane base arranged to connect the crane to a vessel and further comprising a boom extending from the crane base, and wherein an offset between a first of the cable guide elements and the crane base may be larger than an offset between a second of the cable guide elements and the crane base.

As a further option, an offset between a third of the cable guide elements and the crane base may be substantially equal to the offset between the second of the cable guide elements and the crane base.

One or more arms may be connected to the boom, for example at or near a distal end of the boom or at a distance from the distal end of the boom. Multiple arms may be connected at substantially the same distance from the distal end of the boom.

A second aspect provides a vessel arranged for hoisting components such as offshore wind turbine blades, comprising a hoisting arrangement according to the first aspect, wherein the vessel attachment module is connected to the vessel.

A third aspect provides a kit of parts, comprising a first arm, a second arm and a third arm. The first arm and the second arm may be substantially similarly sized and/or shaped, and the third arm may be differently sized and/or shaped. At a proximal end, the first arm and the second arm may comprise a connection member. Using a connection element, an arm may be connected to the vessel at this connection member.

In a particular embodiment of the kit of parts, the first arm and the second arm are connected and/or provided by a single arm. When the first arm and the second arm are provided at a single arm, this single arm may at both ends comprise one or more cable guide elements. At or near a centre of the single arm, the single arm may comprise a connection member for connecting the single arm to the vessel, for example to the crane.

DETAILED DESCRIPTION OF THE EMBODIMENTS

Figure 1A:
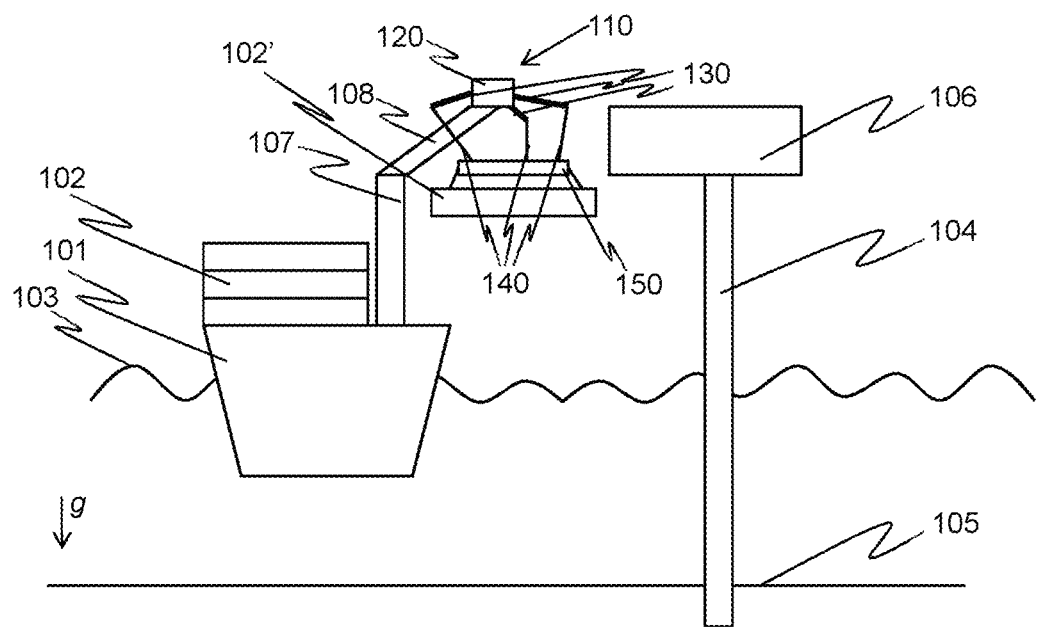
FIG. 1A schematically depicts an offshore wind turbine installation situation.

FIG. 1A schematically depicts an offshore wind turbine installation situation, wherein an installation vessel 101, is provided with a plurality of to be installed wind turbine blades 102. The installation vessel 101 is floating on a body of water 103 such as a sea or ocean, nearby for example a monopole 104 as a mounting structure for a wind turbine. The monopole 104 is for example positioned on the bottom 105 of the body of water, and is in the situation as sketched in FIG. 1A provided with a nacelle 106 and its rotor. The blades 102 are to be mounted to the rotor of the nacelle 106.

Because the vessel 101 as shown in FIG. 1A is not a jack-up vessel, waves, wind and other environmental factors may influence the position and orientation of the vessel 101 relative to the substantially more stationary monopole 104 and nacelle 106. As such, one or more of the six degrees of freedom (surge, heave, sway, roll, pitch and jaw) of the vessel 101 may be affected.

Also in the case of a jack-up vessel, the vessel and the nacelle may not be at a fixed position with respect to each other at all times, due to the effects of wind and wave-loads, e.g. on the monopole, due to vibration of the nacelle, due to deflection and vibrations in the crane, due to any other force acting on any of the vessel and/or the nacelle due to any other force, e.g. wind acting on the gripper arrangement, or any combination thereof.

Attached to the vessel 101, for example the deck thereof, is a crane 107 arranged to lift components such as the wind turbine blades 102 off the deck of the vessel 101 and move the components towards their mounting position. Because the crane 107 is at its base substantially rigidly attached to the vessel 101, one or more of the degrees of freedom of the vessel 101 may be coupled to the crane 107. In such a case, thus, if the vessel moves due to wind, waves, and/or currents, the crane moves as well. The same applies to the nacelle 106 and its rotor, which is substantially rigidly connected to the monopole 104, which can move also due to environmental factors. The same may apply to a situation when a turbine mast 104 and nacelle 106 are connected to a floating platform which may be required to install wind turbines in deep waters.

The crane 107 comprises a crane boom 108, and connected to the boom 108 is a hoisting arrangement 110 for hoisting an offshore wind turbine blade 102 as an example of an offshore component that has to be hoisted. The hoisting arrangement 110 is schematically drawn in FIG. 1A, and comprises a base 120 comprising a boom attachment module as an example of a vessel attachment module arranged to connect the base 120 to the boom 108 of the crane 107, and thus to the vessel.

The attachment of the base 120 to the boom 108 may be a rigid connection, or may alternatively be via one or more actuators, springs, dampers, or any combination thereof. Such actuators, for example a rotary joint actuated with a motor, may be used for example for repositioning the hoisting arrangement 110 relative to the boom 108, the crane 107 and/or the vessel 101.

Next to or instead of being arranged for hoisting an offshore wind turbine blade 102, the hoisting arrangement 110 may be arranged for hoisting other loads. Such loads may be other wind turbine components, but also other construction components which have to be hoisted, or any other component. Next to hoisting of an attached load, the hoisting arrangement might also be used exclusively to only control a position and/or orientation of an attached load.

Extending from the base 120 is a plurality of arms 130, wherein the arms 130 are at a proximal end connected to the base 120. Suspended from distal ends of the arms 130 is a plurality of cables 140. The cables 140 connect to a gripper attachment 150 which is arranged to be connected to a gripper dedicated for carrying a component, such as the turbine blade 102'. Six degrees of freedom of the gripper attachment 150 may be manipulated within a certain work space by manipulating the lengths of the cables between the arms from which they are suspended and the gripper attachment 150.

In FIG. 1A, a crane base 600 is indicated. The crane base 600 is arranged to connect the crane to the vessel. Hence, the crane base 600 may for example be connected to the deck of the vessel. Extending from the crane base 600 is the boom 108 of the crane.

Figure 1B:
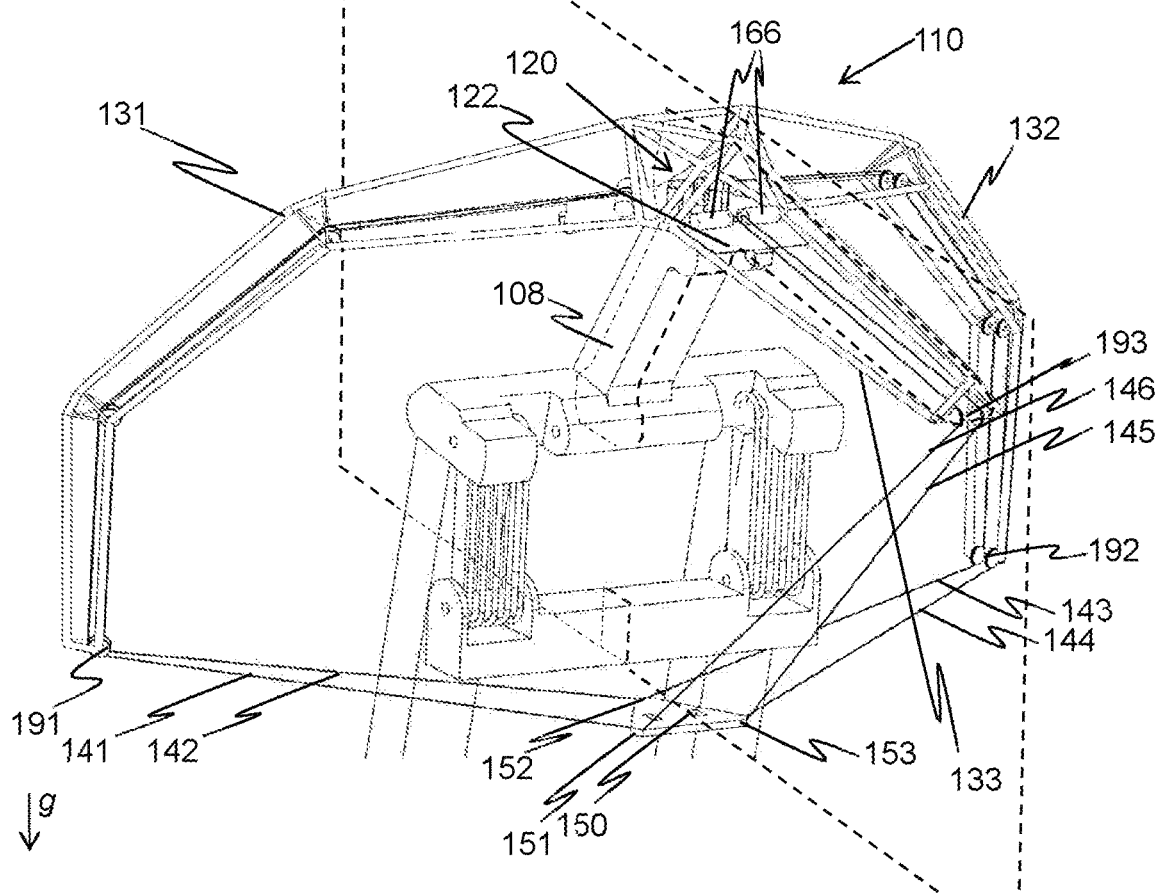
FIG. 1B shows a detailed view of an embodiment of a hoisting arrangement.

FIG. 1B shows a detailed view of an embodiment of a hoisting arrangement 110 connected to the boom 108 as part of a crane. The hoisting arrangement 110 comprises a base 120 comprising a boom attachment module 122 arranged to connect the base 120 to the boom 108 of the crane 108.

Extending from the base 120 are a first arm 131, a second arm 132, and a third arm 133 as a plurality of arms. The arms are at a proximal end connected to the base 120, and distal ends of the arms define a pyramid together with the base 120. In this particular embodiment, an imaginary pyramid may be seen, with a triangular base formed by distal ends of the arms and the top of the pyramid formed by the base.

In the embodiment of the hoisting arrangement 110 of FIG. 1B, the boom attachment module 122 is provided within the imaginary pyramid defined by the distal ends of the arms and the base 120. In other embodiments, all or at least part of the boom attachment module 122 may form part of the imaginary pyramid, all or at least part of the boom attachment module 122 may be provided outside the imaginary pyramid, or different parts of the boom attachment module 122 may be provided inside and outside the imaginary pyramid.

When the boom attachment module 122 is provided within the pyramid defined by the distal ends of the arms and the base 120, when the crane 107 is in use, the base 120 may be provided on top of the boom 108, and not suspended from it. Alternatively, the base 120 may be suspended from the boom 108.

In alternative embodiments, the arms and the base 120 may be provided in substantially the same plane. That plane may be oriented in any of the three spatial orientations with respect to the boom 108.

A gripper attachment 150, arranged to be connected to a gripper for a wind turbine blade as a component that is to be hoisted, is supported from a first cable 141, a second cable 142, a third cable 143, a fourth cable 144, a fifth cable 145, and a sixth cable 146 as a plurality of cables. The plurality of cables is suspended from distal ends of the arms, and more specifically in this embodiment the first cable 141 and the second cable 142 are suspended from the distal end of the first arm 131, the third cable 143 and the fourth cable 144 are suspended from the distal end of the second arm 132, and the fifth cable 145 and the sixth cable 146 are suspended from the distal end of the third arm 133.

When the gripper attachment 150 is suspended from the plurality of cables, it is suspended with a work space. This work space is defined by the shape of the arms and the length and number of the cables. By manipulating the length of one or more, and preferably all, of the cables from which the gripper attachment 150 is suspended, the gripper attachment 150 may be moved within the work space. The movement may be over one or more of the three translational degrees of freedom (surge, sway and heave), may be over one or more of the three rotational degrees of freedom (pitch, roll and yaw) or a combination thereof.

In the embodiment of the hoisting arrangement as shown in FIG. 1B, the cables in the plurality of cables are arranged as pairs, wherein the first cable 141 and the second cable 142 form a first pair, the third cable 143 and the fourth cable 144 form a second pair, and the fifth cable 145 and the sixth cable 146 form a third pair, respectively suspended from the first arm 131, the second arm 132, and the third arm 133.

The cables are suspended from their respective arms via pulleys and/or sheaves that are mechanically mounted such that the entrance and exit orientation of any cable can be suitably accommodated by the pulley/sheave. For this purpose, the pulleys and/or sheaves themselves may change their orientation by for example using appropriate mechanical suspension, e.g. through small passive hinge mechanisms.

In embodiments, one or more of the cable attachment points referred to as 191, 192, and 193 may be directly connected to the vessel, for example to the boom 108, instead of being suspended from an arm.

The gripper attachment 150 comprises six attachment points for attaching a cable to. As shown in FIG. 1B, the attachment points are aligned in sets of two attachment points near vertices of an imaginary triangle comprised by the gripper attachment 150. Any other shape could be chosen also for this attachment, leading to changes in the available work space. In the embodiment of FIG. 1B, the gripper attachment 150 is substantially shaped as a triangle. However, in other embodiments, the gripper attachment 150 may not be shaped as a triangle.

Attached near a first vertex 151 of the gripper attachment 150 is the first cable 141 and the sixth cable 146. Attached near a second vertex 152 is the second cable 142 and the third cable 143. Attached near a third vertex 153 is the fourth cable 144 and the fifth cable 145. With this configuration of cables, six degrees of freedom of the gripper attachment 150 may be controlled by manipulating the length of one or more cables spanned between the distal end of the respective arm and the gripper attachment 150.

In the embodiment of the hoisting arrangement 110 as shown in FIG. 1B, when regarded from a top view, the first arm 131, the second arm 132 and the third arm 133 are provided at a constant angular spacing. Since in this particular embodiment three arms are provided, the arms are spaced 120 degrees apart from each other. In other embodiments, the arms may be provided at a non-constant angular spacing. Furthermore, the spacing between for example the third arm 133 and the first arm 131, and the third arm 133 and the second arm 132 may be substantially equal, whereas the spacing between the first arm 131 and the second arm 132 is smaller or larger.

A non-constant spacing between all three arms may also be used. For example, a spacing of approximately 140, 100 and 120 degrees may be used.

In the embodiment of the hoisting arrangement 110 of FIG. 1B, the first arm 131 and the second arm 132 are shaped substantially equally, and thus form two substantially equally sized arms. The third arm 133 is shaped differently.

The third arm 133 is a substantially straight arm, whereas the first arm 131 and the second arm 132 are substantially curved. In this particular embodiment, the curvature in the first arm 131 and the second arm 132 is obtained by a plurality of connected straight arm section, which are interconnected under an angle.

The first arm 131 and the second arm 132 extend substantially in a same plane as the base 120 at their proximal end. However, by virtue of their curvature, the distal end of the first arm 131 and the distal end of the second arm 132 extend substantially parallel to the boom 108.

If the boom is oriented substantially parallel to gravity vector g, substantially parallel to the boom 108 may mean substantially parallel to gravity vector g. Alternatively, the boom 108 may be provided at an angle relative to gravity vector g, for example at an angle between 0° and 5°, 5° and 10°, 10° and 15°, 15° and 20°, or angle larger than 20°.

In this particular embodiment, the third arm 133 as the different size arm extends substantially in the same plane as the base, the distal ends of the first arm 131 and the second arm 132 are oriented substantially perpendicular to the third arm 133.

As shown in FIG. 1B, the attachment module 120 is connected to the boom 108 such that the boom 108 and the third arm 133 as the differently sized arm are substantially provided in the same plane. This plane is oriented substantially normal to the gravity vector g, when the hoisting arrangement 110 is in use.

The hoisting arrangement 110 of FIG. 1B further comprises a control system (not shown) comprising a plurality of winches on which cables can be wound and unwound. Indicated in FIG. 1B with reference numeral 166 are two winches, which are associated with the third arm 133, and thus with the fifth cable 145 and the second cable 146. Preferably, for each cable comprised by the hoisting arrangement 110 and for which the length is to be controlled, a winch is provided.

When the hoisting arrangement 110 is provided with the winches, no cables have to be run down the crane 107 to a winch which otherwise would be provided on the vessel 101, for example on the deck thereof. In FIG. 1B, the winches 166 are provided on the base 120.

In other embodiments, one or more of the winches 166 may be provided anywhere on an arm between the distal end of the arm and the proximal end of the arm. In even other embodiments, the winches 166 are not provided on the hoisting arrangement 110, but are provided somewhere else on the vessel 101 and/or on the crane 107. In the latter embodiment, the winches may be heavier and thus more powerful, to be able to carry a larger load. In this case, any of the cables may be re-routed along one or multiple pulleys and/or sheaves.

When the winches 166 are provided in or on the base 120, the winches 166 may be provided outside the pyramid defined by the distal ends of the arms and the base 120.

The control system further comprises a controller arranged to control the winches, preferably in a coordinated way, for manipulating the position and/or orientation of the gripper attachment 150 within the work space. The controller may be arranged to simultaneously control the winding or unwinding of multiple winches in order to manipulate the position and/or orientation of the gripper attachment 150 as desired.

For example may a user input via a joystick be used to provide the desired position and/or orientation of the gripper attachment 150 or any arbitrary point related geometrically to the gripper attachment 150 which location is either known or can be measured by the control system with dedicated sensors. Such arbitrary points that can be controlled via a joystick can then also be for instance the root of a turbine blade that is attached to a blade gripper.

Additionally or alternatively, the control system may be arranged to determine a difference between the current position and/or orientation of the gripper attachment 150 and/or the load suspended from the gripper attachment 150 and a desired position and/or orientation of the gripper attachment 150 and/or the load suspended from the gripper attachment 150.

By decreasing this difference, the controller may for example position and/or orientate a turbine blade 102 relative to the nacelle 106 and/or its rotor such that the turbine blade 102 can be attached.

The control system may be arranged to determine the relative positions between the gripper attachment 150 and/or the base 120, or the relative positions between the gripper attachment 150 and/or the load suspended from the gripper attachment 150 and the plane that connects the distal ends of the plurality of arms 130 and/or to determine the relative position between the gripper attachment 150, and/or the load suspended from the gripper attachment 150 and the nacelle 106.

The control system may further be arranged to compensate for vessel motions resulting for example from waves and wind. As such, the suspended payload may be stabilized and substantially kept from moving relative to an Earth-fixed frame of reference.

The hoisting arrangement 110 may further comprise one or more force sensors arranged to provide a sensor signal related to a tension on one or more of the cables. Such a sensor may be provided between the point from which the cable suspends from an arm and the point where it is attached to the gripper attachment 150 or alternatively or additionally be provided also as an integrated part in the winches. For example, could the tension be measured indirectly by measuring the torque that a winch produces on a cable.

The control system may be arranged to receive the sensor signals and to control the winches based on the received signals. For example, when a tension in one or more of the cables exceeds or goes below a threshold value, the gripper attachment 150 may be repositioned and/or reoriented such that the threshold value is not exceeded anymore, preferably such that the control system remains stable.

Figure 2A:
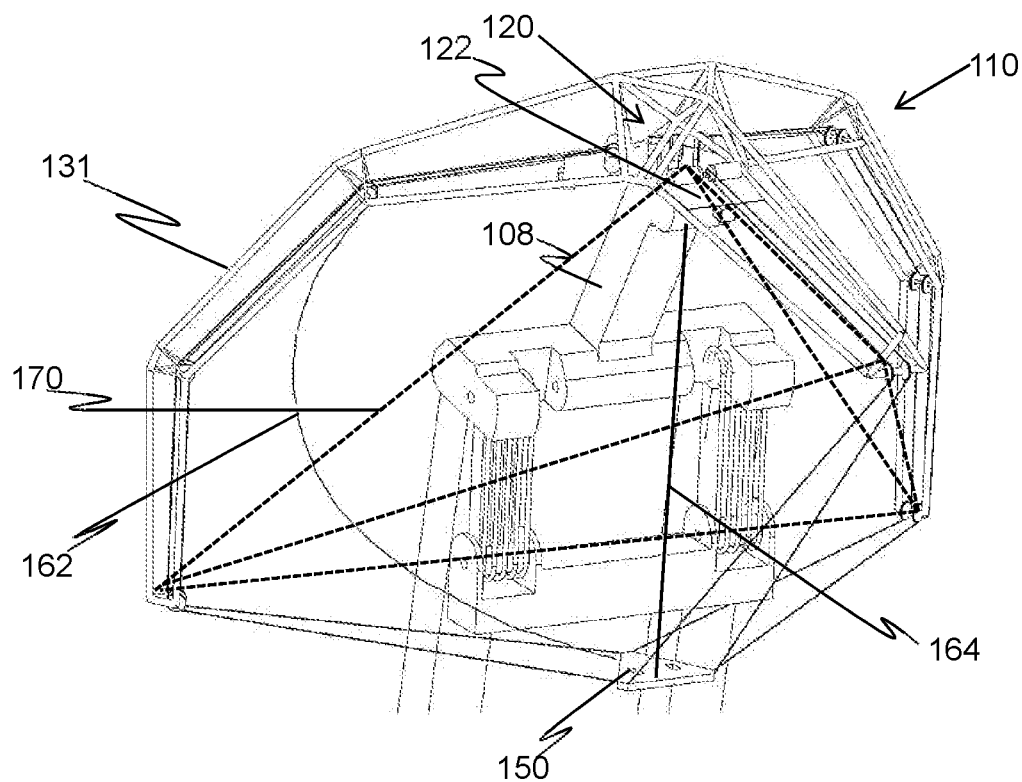
FIG. 2A shows another embodiment of the hoisting arrangement.

FIG. 2A shows an embodiment of the hoisting arrangement 110 similar to the embodiment of FIG. 1B, but with two additional features which are both optional.

As a first option, the hoisting arrangement 110 is provided with an umbilical 162 provided between the first arm 131 as one of the arms, and the gripper attachment 150. The umbilical 162 may be used for transferring a data signal between the gripper attachment 150 and the crane 107, and optionally via the crane 107 to the vessel 101 and to the control system. The data signal may comprise data from one or more force sensors, which may be provided on the gripper attachment 150. The gripper attachment 150 may further be provided with other sensors, such as cameras, proximity sensor, any other sensor that are required to measure for instance a position and orientation of the gripper attachment 150 with respect to another point in space, such as a part of the wind turbine, or any combination thereof. Signals outputted by such sensor may also be transferred via the umbilical 162, which may for example be arranged as cable with one or more cores, which cores may comprise a conductive material such as copper and/or optical cables.

As a second option, the hoisting arrangement 110 is arranged for accommodating an auxiliary cable 164 of the crane, which auxiliary cable 164 is arranged to be suspended between the crane 107 and the gripper attachment 150 through the base 120. As such, the crane 107, which is typically arranged for hoisting large weights, may be used for carrying at least some of the weight of the gripper attachment 150, optionally in combination with the hoisting arrangement, and any attached or suspended load, such as a wind turbine blade 102, connected to the gripper attachment 150. This may decrease the load on at least one of the arms of the plurality of the arms comprised by the hoisting arrangement 110 and/or on the cables by which the gripper attachment 150 is suspend. This in turn may allow the use of a smaller and/or lighter hoisting arrangement 110.

FIG. 2A further shows as dotted lines the imaginary pyramid 170 between the distal ends of the arms and the base 120. As visible in FIG. 2A, the gripper arrangement 150 may extend outside this imaginary pyramid 170.

Figure 2B:
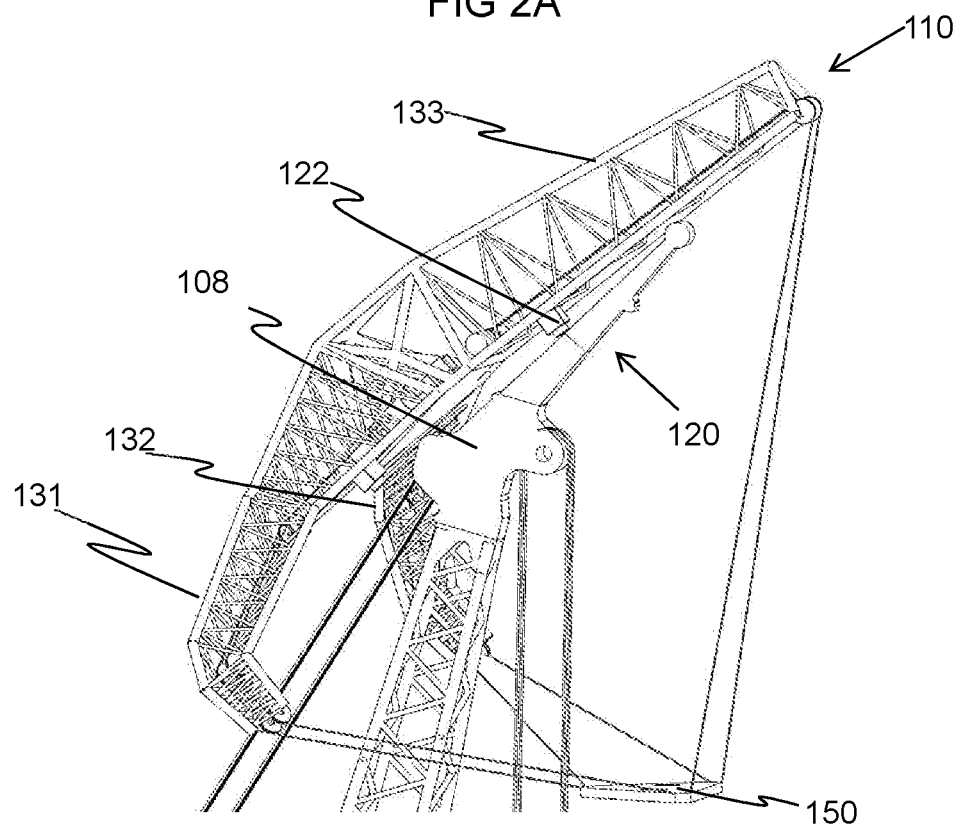
FIG. 2B shows an alternative embodiment of a hoisting arrangement FIG. 3A and FIG. 3B respectively show a side view and a front view of an embodiment of a hoisting arrangement.

FIG. 2B shows an alternative embodiment of a hoisting arrangement 110, wherein the arms are shaped differently than the arms as shown in FIG. 2A. In the hoisting arrangement 110 of FIG. 2B, the distal ends of the arms, and the base 120 define a pyramid, which pyramid is shaped flatter than the pyramid 170 if FIG. 2A.

Figure 3A:
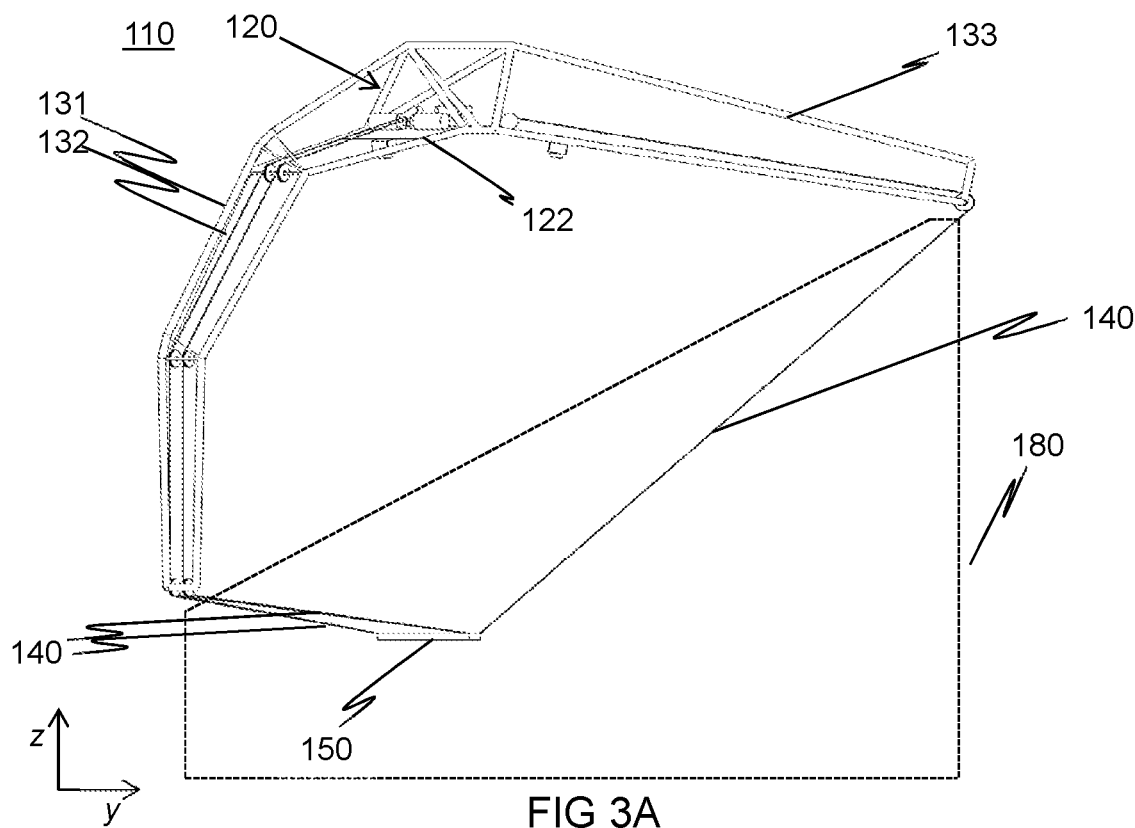
Figure 3B:
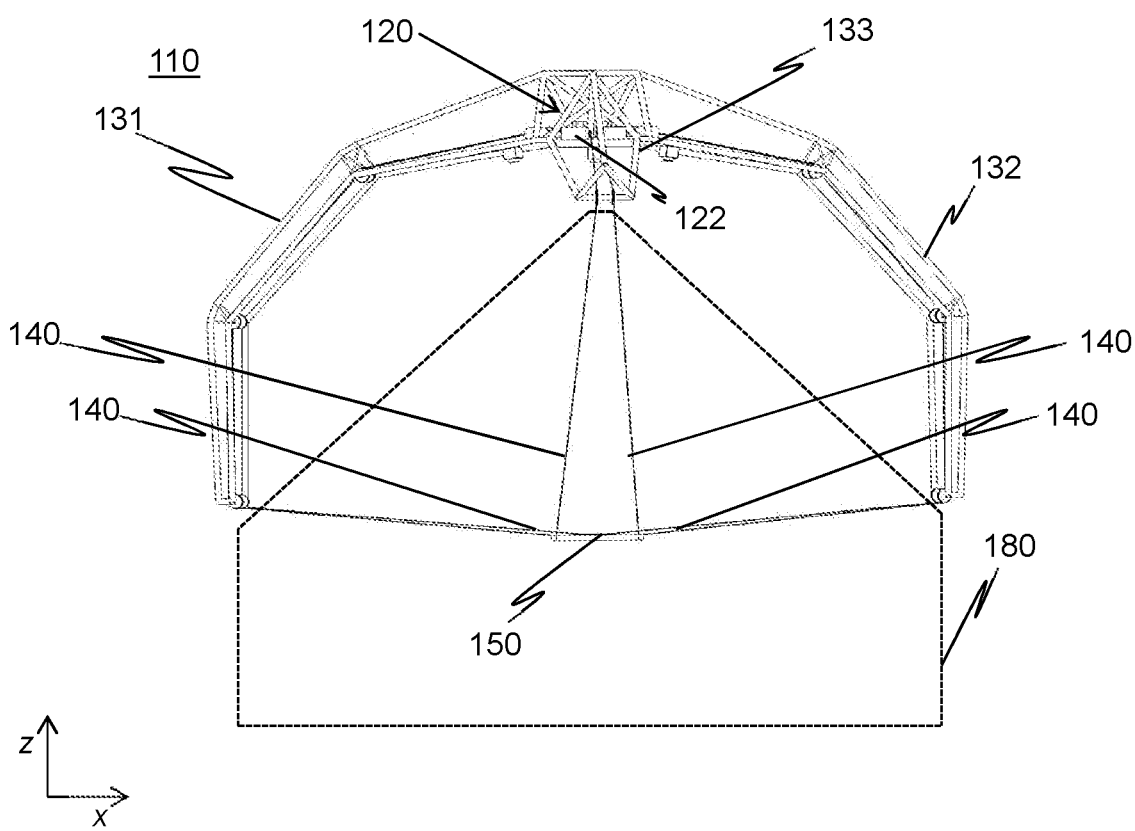

FIG. 3A and FIG. 3B respectively show a side view and a front view of an embodiment of a hoisting arrangement 110, comprising a base 120 comprising a boom attachment module 122, and a first arm 131, second arm 132 and third arm 133 extending from the base 120. Suspended from cables 140 is the gripper attachment 150.

In FIGS. 3A and 3B, a coordinate system is defined of three orthogonal axes: x, y, and z. The z-axis is a vertical axis pointing in the opposite direction of the gravity vector g, and a plane spanned by the x-axis and the y¬-axis is the horizontal plane. In FIG. 3A, the x-axis points into the paper, and in FIG. 3B the y-axis points out of the paper in a right-handed sense.

By manipulating the lengths of the cables 140 between the distal ends of the arms and their attachment points on the gripper attachment 150, the position and/or orientation of the gripper attachment 150 may be manipulated. The extreme positions and orientations of the gripper attachment 150 delimit the work space of the gripper attachment 150.

In FIG. 3A, shown as an area delimited by dotted line 180, an exemplary work space is shown. On the y¬-axis, the work space is limited between the distal ends of the first arm 131 and the second arm 132, and the distal end of the third arm 133.

In FIGS. 3A and 3B, the work spaces, delimited by dotted lines 180, are only examples. In different embodiments of the hoisting arrangement 110, different work spaces may be achieved. The dimensions and shape of the work space for example depend on the available maximum cable lengths, the shapes of the arms, the shape of the boom 108, the shape of the gripper attachment 150, how the hoisting arrangement 110 is connected to the boom 108 and in which orientation, the use of and position of any winches, pulleys and/or sheaves on which one or more cables are run, any other factor, or any combination thereof.

Furthermore, the work spaces as depicted in FIGS. 3A and 3B only relate to the translational degrees of freedom of the gripper attachment 150 but equivalently also a rotational or orientational workspace exists (not shown). By controlling the cable lengths between the arms and the gripper attachment 150 properly, also rotation around the x-axis, rotation around the y-axis, and/or rotation around the z-axis may be achieved. The amount of degrees of rotation available around each axis may also be included in the work space of the gripper attachment 150, and may also depend on the shape and cable attachment points of the gripper attachment 150, the available cable lengths, the shape of the arms, any other factor, or any combination thereof.

Figure 4:
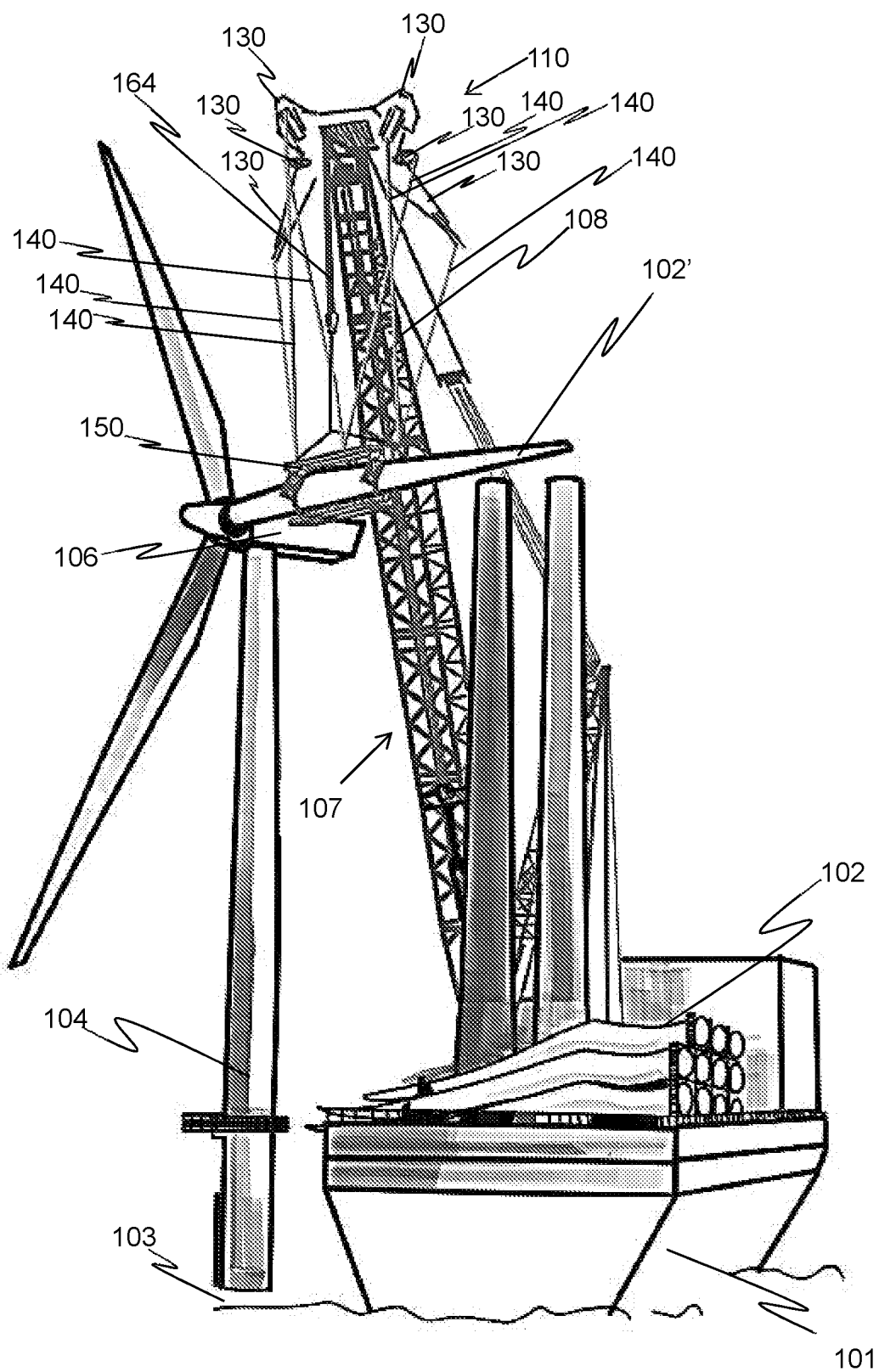
FIG. 4 shows an alternative embodiment of a hoisting arrangement.

FIG. 4 shows an alternative embodiment of a hoisting arrangement 110, which is connected to a boom 108 of a crane 107. The crane 107 is positioned on a vessel 101 floating on a body of water 103.

In the embodiment of FIG. 4, the hoisting arrangement 110 comprises six arms 130 and a plurality of cables 140 from which the gripper attachment 150 is suspended. For example may the hoisting arrangement 110 of FIG. 4 comprises six cables 140, not divided into pairs of two cables but each cable assigned to each arm 130 and attaching to specific points on the gripper attachment 150.

The hoisting arrangement 110 is further provided with auxiliary cable 164, arranged for supporting a part of the weight of the gripper attachment 150 and the wind turbine blade 102' connected to the gripper attachment, which may be a significant part of this weight.

Next to hoisting arrangements 110 with three or six arms, hoisting arrangements 110 with any other amount of arms, such as four, five, seven, eight, or even more, are envisioned. Also, in combination with any amount of arms, any amount of cables may be used. Of the cables, some or preferably all of their lengths may be controllable for manipulating a position and/or orientation of the gripper attachment 150 and/or or the load connected to the gripper attachment 150.

Independent on the exact configuration of the hoisting arrangement, cables and gripper attachment, the control system is arranged such as to measure, determine and/or calculate the position and/or orientation of the gripper arrangement 150 and/or suspended load (hereafter commonly denoted as 'the payload') with respect to the base 120 (or w.r.t. any other reference that is statically related with the base 120), to measure at least one or more of the following relative positions and/or orientations, i.e. between the payload and the base, the payload and the vessel, the payload and any point on the nacelle 106 or its rotor, and use this relative position measurement to compute adequate control actions that command the winches to control the cables.

Additionally, force information measured in the cables may be used by the control system to compute suitable cable trajectories in order to move or to stabilize the payload against motions of the vessel, motions of the crane, relative motions between the payload and the turbine and/or to stabilize the payload against external influences such as loading and hence induced motion by wind that presses directly on the payload.

The control system may furthermore be arranged such that no cable will perform undesired motions which could result in undesired and uncontrolled movements of the payload. The control system may be arranged to incorporate multiple levels of cascaded control loops, such as to ensure closed-loop control of forces, torques and/or positions and velocity between the base 120 and the payload.

The control system may further more be arranged such as to compensate all relative motions between the payload against motions of the vessel, motions of the crane or to cancel-out all relative motions between a static and/or movable nacelle and the payload suspended on the crane.

Although in the different figures the arms are embodied as truss structures with the respective cables running through the truss structures, one or more of the arms may be arranged differently. Furthermore may the respective cables run over, under, and/or alongside the arm and/or be routed entirely differently between the base and the vessel.

For instance, the cables 141 and 142 in FIG. 1B, as well as the cables 143 and 144 which leave the arms 131 and 132 of the hoisting arrangement 110, on cable attachment points 191 and respectively on 192, may be routed to alternative cable attachment points (not shown) that are then mounted directly on the crane boom 108 instead of being mounted on arms 131 and 132 of the hoisting arrangement. Such mechanical arrangement changes may be made without having an impact on the available work space of the gripper attachment 150. However, the embodiment shown in FIG. 1B may have the advantage that the cables do not otherwise disturb the nominal operation of the crane 107.

Figure 5:
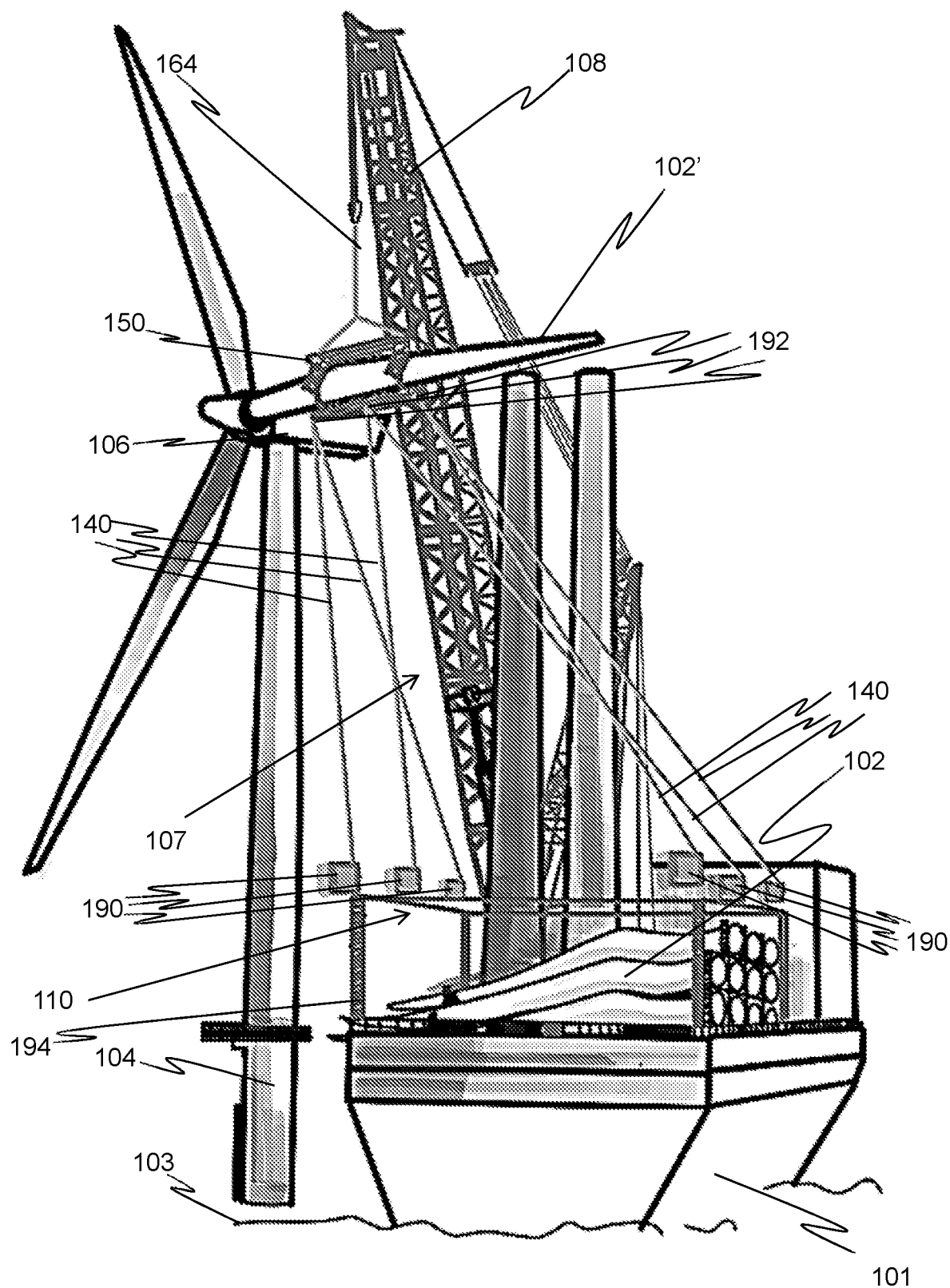
FIG. 5 shows another alternative embodiment of a hoisting arrangement.

FIG. 5 shows yet another embodiment of a hoisting arrangement 101, wherein a frame 194 as the vessel attachment module is connected to the vessel, in this example to the deck thereof. Spanned between cable guide elements 190 of the vessel attachment module 194 and cable attachment points of the gripper attachment 150 is the plurality of cables 140, in this example six cables. The gripper attachment 150 is further supported by the auxiliary cable 164.

By manipulating the spanned cable length of one or more, preferably all, of the cables 140 in the plurality of cables between cable guide elements 190 of the vessel attachment module 194 and cable attachment points 192 of the gripper attachment 150 and the auxiliary cable 164, the position and/or orientation of the gripper attachment 150 can be controlled within the work space.

As shown in FIG. 5, the cable attachment points 192 are arranged as a triangle as a first polygon. The cable guide elements 190 are arranged as a rectangle as a second polygon, wherein four of the cable guide elements 190 are provided on corners of the rectangle, and two are provided on ribs of the rectangle.

In the embodiment of FIG. 5, the cable attachment points of the gripper attachment are provided on two sides of the gripper attachment, i.e. a top side and a bottom side. In different embodiments of the hoisting arrangement, cable attachment points may be provided on only one side of the gripper attachment, or even on more than two sides of the gripper attachment.

A vessel attachment module 194, or a part thereof, may be attached to one or more different parts of a vessel, such as the deck, a part of the crane, the hull, any other part of the vessel or any combination thereof or might even be located on another vessel.

Figure 6:
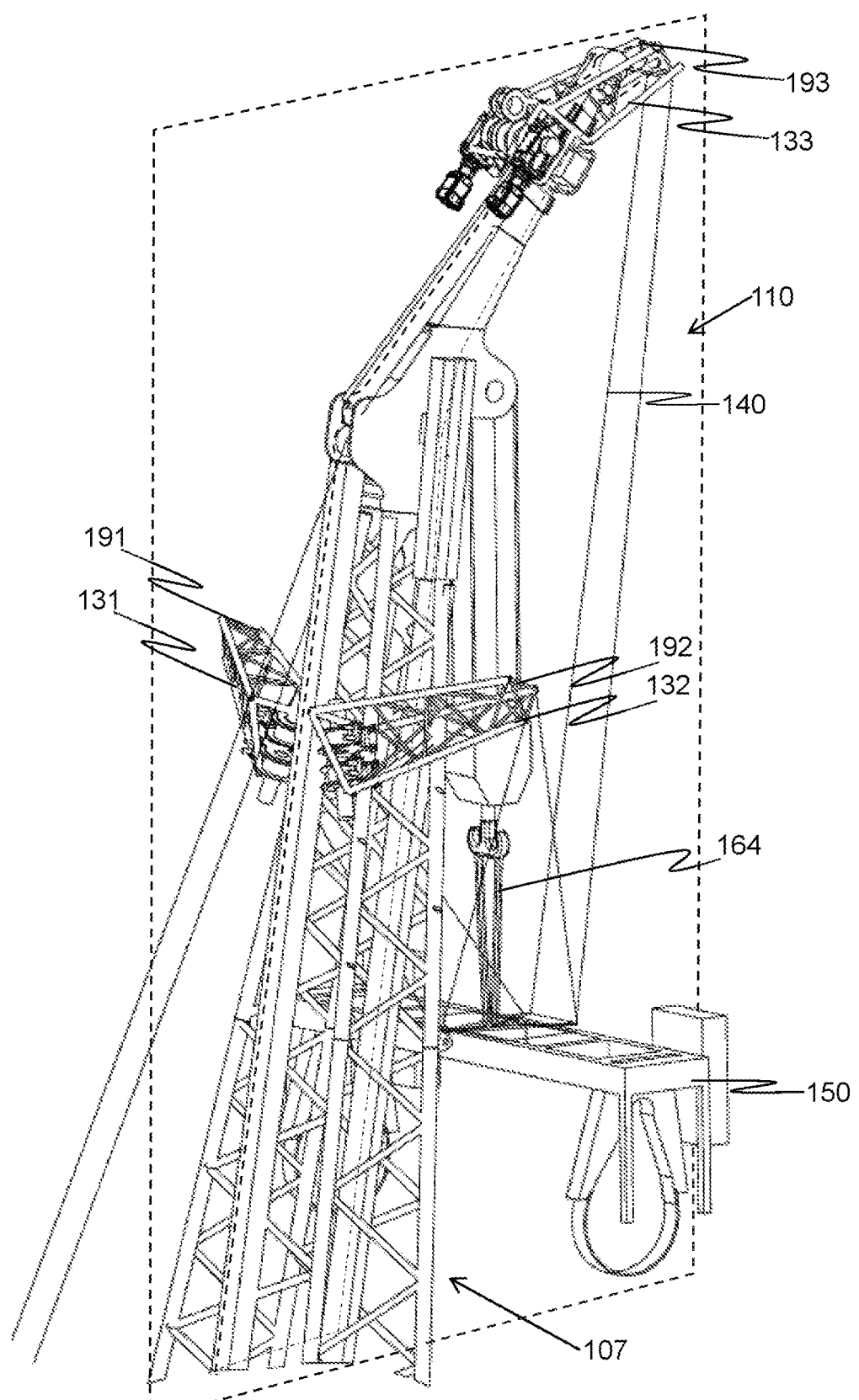
FIG. 6 shows another embodiment of a hoisting arrangement.

FIG. 6 shows yet another embodiment of a hoisting arrangement 110 for hoisting an offshore wind turbine blade. The hoisting arrangement 110 is an option mounted on an already present crane 107 of a vessel. The hoisting arrangement 110 may be provided as a kit of parts, and in a method the different components of this kit of parts may be individually mounted to the crane 107. The components may for example be mounted in the arrangement of FIG. 6 or FIG. 8.

It may be understood that a hoisting arrangement in general may comprise different components; in some examples, in which the components are connected to one another in a connected state, the components may be disconnected from each other prior to being connected to a crane and/or a vessel. If the components are not connected to one another, it may not be required to disconnect the components prior to mounting them individually to the crane 107 that may be already present on a vessel.

The hoisting arrangement 110 comprises a first arm 131, a second arm 132, and a third arm 133 as a plurality of arms. Hence, a kit of parts for mounting a hoisting arrangement to a crane may comprise the first arm 131, second arm 132 and third arm 133 as for example depicted in FIG. 6. In particular, the first arm 131 and the second arm 132 may be substantially equally sized. Furthermore, as another option, the third arm 133 may be sized differently than the first arm 131 and the second arm 132. Optionally, the shape of the first arm 131 may be mirrored relative to the shape of the second arm 132.

The first arm 131 and the second arm 132 may at proximal ends be connected to the crane 107. Hence, the first arm 131 and the second arm 132 may comprise at their proximal ends a connection member, and the kit of parts may comprise, as part of a vessel attachment module, one or more connection elements for connecting the first arm 131 and the second arm 132 to the crane at their respective connection member. For example, an arm may be connected to the crane using one or more clamped connections, bolts, welds, pad-eyes, plates with holes for receiving bolts welded or otherwise connected to the arms, any other type of connection, or any combination thereof. Required components for the connection, such as one or more clamps, bolts, or any other connecting element may be provided with the kit of parts.

At distal ends of the first arm 131 and the second arm 132, respectively cable attachment points 191 and 192 are provided. Furthermore, at a distal end of the third arm 133, a cable attachment point 193 is provided. A plurality of cables 140 span between the cable attachment points and a gripper attachment 150, which is arranged to be connected to a gripper dedicated for carrying a component, such as the turbine blade. The cable attachment points may be points at which the cables are fixed. In another embodiment, the cable attachment points are pullies over which the cables are guided between the gripper attachment and a winch. In another embodiment, the cable attachment points are implemented as winches.

In the embodiment of FIG. 6, the third arm 133 is connected at a distal end of the crane 107, at or near the top of the boom. As such, in use, at least part of the third arm 133 may be positioned above the gripper attachment 150.

The cable arrangement in the embodiment of FIG. 6 may be substantially similar to the cable arrangement as shown in FIG. 1B and/or as elaborated on in this description.

As an option, the gripper attachment 150 is also suspended from an auxiliary cable 164 of the crane. For example, when a component with a high weight has to be suspended from the gripper attachment 150, the auxiliary cable 164 may be used to prevent overloading the other cables 140.

Figure 7A:
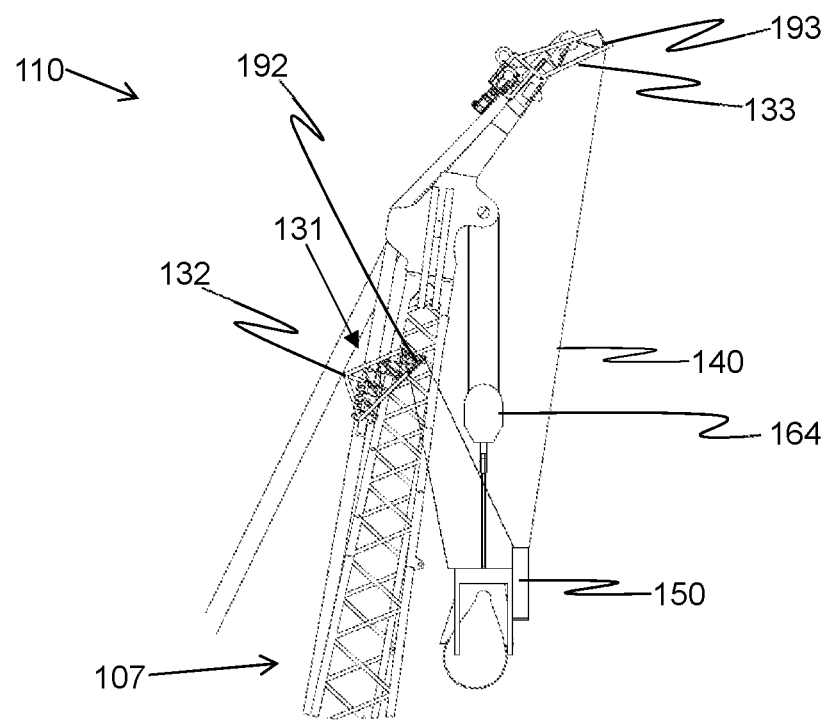
FIGS. 7A and 7B respectively show the hoisting arrangement of FIG. 6 in a side view and a front view.
Figure 7B:
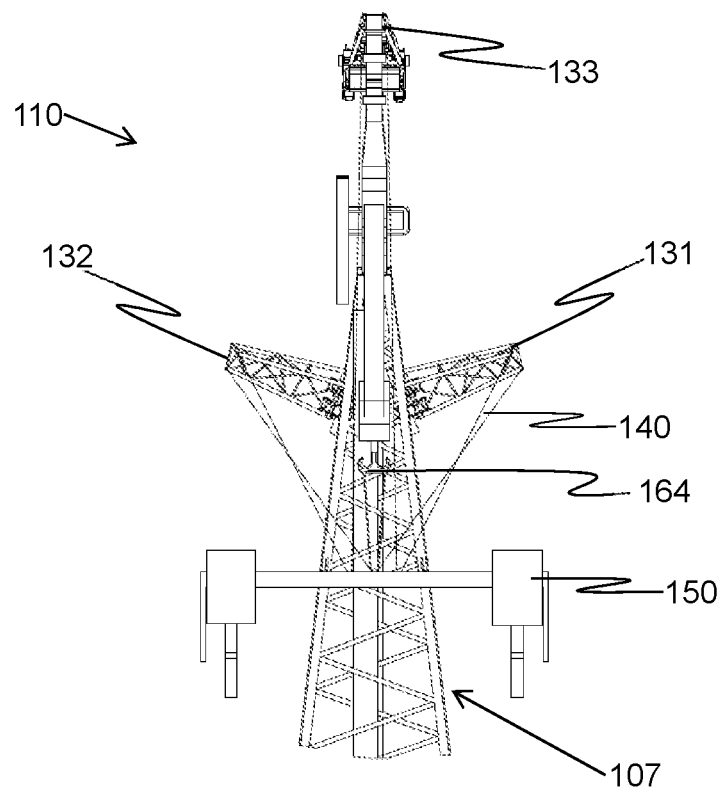

FIGS. 7A and 7B respectively show the hoisting arrangement 110 of FIG. 6 in a side view and a front view. FIG. 7A shows in a side view of the hoisting arrangement 110 that the third arm 133 extends further in a lateral direction than the second arm 132 and the first arm 131. In particular, the cable attachment point 193 of the third arm 133 may extend further in a lateral direction than the second arm 132, i.e. in a direction perpendicular to the boom of the crane 107, in the plane defined by the boom of the crane 107 and the third arm 133.

As an option, depicted in FIG. 7A, the third arm 133 is positioned at an angle relative to horizontal. In other embodiments, the third arm 133 may be oriented substantially horizontal, in use. Preferably, the third arm 133 is provided to the crane 107 under an angle relative to the boom.

The front view of FIG. 7B shows that as an option, the first arm 131 and the second arm 132 are similarly shaped, in a mirrored fashion. The first arm 131 and the second arm 132 may be oriented at an angle relative to the boom of the crane 107, which may be in the front view oriented substantially vertical. The angle between the crane and the first arm 131 may be substantially the same as the angle between the crane and the second arm 132. In this way, the distal points and proximal points of the first arm 131, the second arm 132 and the third arm 133 may form a polyhedron having a non-zero volume.

The line from the distal points to the proximal points may be defined at the front sides of the arms, on a centreline of the arms or at a rear side of the arms. The front sides of the arms are in FIG. 7A provided at the right side of the drawing. A polyhedron may in this example be defined by distal points and proximal points of the arms and by connecting each point to all other points of the arms, distal as well proximal. In FIG. 7A, this would mean that each point, either proximal or distal, would be connected to five other points by imaginary lines to form a polyhedron with six sides, as the proximal points of the first arm 131 and the second arm 132 coincide. For distal points, a middle of an axis of a pully as a cable guide element may be taken. For proximal points, a centre point, lower point, upper point, outer point or inner point of a location at which an arm may be connected to the boom may be taken. As such, the polyhedron may be defined within the arms and/or excluding the arms, or around the arms and/or including the arms.

FIG. 7A shows part of a first offset O1 between the crane base 600 and the third cable guide element 193, and part of a second offset O2 between the crane base 600 and the second cable guide element 192. The crane base 600 is for conciseness of FIG. 7A not shown here, but is for example depicted in FIG. 1A.

FIG. 7B shows that as an option, the offset between the second cable guide element 192 and the first cable guide element 192 may be substantially zero. Hence, the offset between the first cable guide element 191 and the crane base 600 may be substantially equal to the offset O2 between the second cable guide element 192 and the crane base 600. The cable guide elements may be implemented as pullies.

An offset will hence be understood as a distance between two components along a single direction, which may for example be parallel to gravity. For example, a first imaginary horizontal plane may be drawn through the crane base 600, and a second imaginary horizontal plane may be drawn through the first cable guide element 191.

The offset between the crane base 600 and the first cable guide element 191 may then be the distance between the first imaginary horizontal plane and the second imaginary horizontal plane which may thus be a vertical offset. Hence, a change in horizontal of one or both of the crane base 600 and the first cable guide element 191 does not affect the offset. The offset is hence calculated differently than a distance between two components, which would be the length of a straight line drawn between the two components.

The vertical offset may be dependent on the orientation of the boom relative to the horizon. Hence, only for particular orientations of the boom 108, the offset between the crane base 600 and the first cable guide element 191 may be smaller than the offset between the crane base 600 and the third cable guide element 191. For example, the orientation may be larger than 20 degrees, larger than 45 degrees, larger than 60 degrees or even larger than 75 degrees, preferably 80 or 85 degrees or larger for installation of high turbines.

Depicted in FIGS. 7A and 7B are a first path length 772 along the boom and a second path length 773 along the boom 108, which path lengths may partially overlap. The first path length 772 is provided between the crane base 600 and the second cable guide element 191 via the second arm 132, and the second path length 773 is provided between the crane base 600 and the third cable guide element 193 via the optional third arm 131. The second path length 773 may be larger than the first path length 772, for example due to a difference in path lengths over the second arm 132 and the third arm 133, and/or due to a distance between a distal end 777 of the boom 108 and the second arm 132.

A path length may be along a path which comprises different sections, which sections may be at an angle relative to adjacent sections. The orientation of a path length may substantially correspond to a centre line of the boom 108 and/or an arm.

Figure 8:
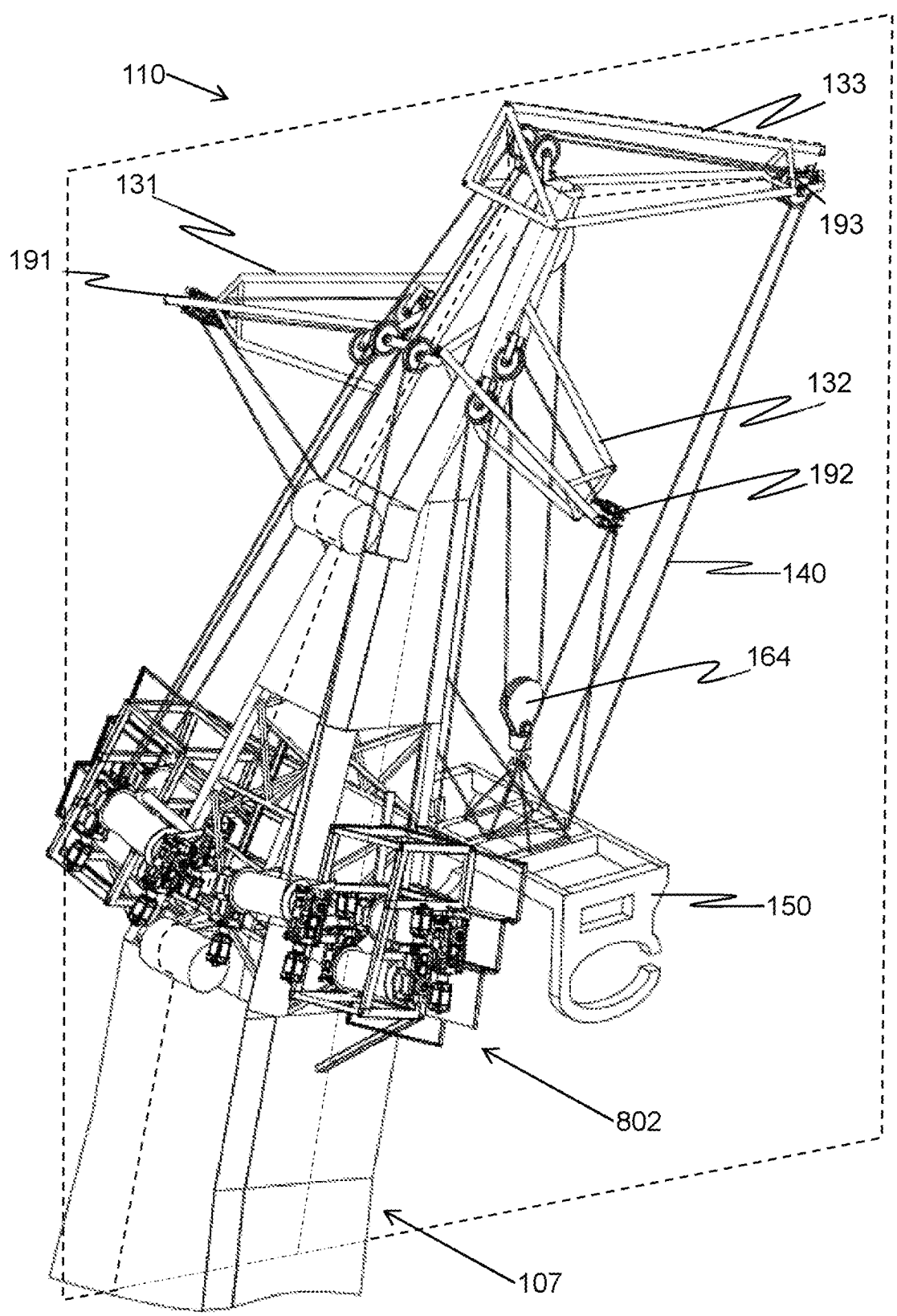
FIG. 8 shows yet another embodiment of a hoisting arrangement.

FIG. 8 depicts yet another embodiment of a hoisting arrangement 110, comprising the first arm 131, second arm 132 and third arm 133. The three arms may be provided separate from the crane 107, for example in a kit of parts as discussed above.

As an option also applicable in other embodiments, the arms are shaped as open structures comprising a plurality of trusses. As such, the arms may be light and stiff. As a further option, one or more plates made from plate material may be comprised by an arm. A plate may be used to connect the arm to the crane.

As a further option which also may be applied to other embodiments, the hoisting arrangement may comprise one or more winches 802. By virtue of the winches, the length of one or more of the cables 140 may be controlled.

In particular, one or more or all of the winches may be positioned below the first arm 131 and the second arm 132. A lower position of the winches, and hence a smaller offset relative to the crane base 600, may lower the centre of gravity of the crane, and the vessel supporting the crane. This lower centre of gravity may increase stability of the vessel and will lead to less mass near the boom-tip of the crane which may otherwise cause large stresses along the boom. The one or more winches, and one or more connection members for connecting the winches to the crane 107 may be comprised by embodiments of kits of parts.

Hence, it will be understood that one or more winches may be provided on one or more of the first arm 131, second arm 132 and/or the third arm 133 and/or one or more winches may be provided separate from one or more of the first arm 131, second arm 132 and/or the third arm 133.

Figure 9A:
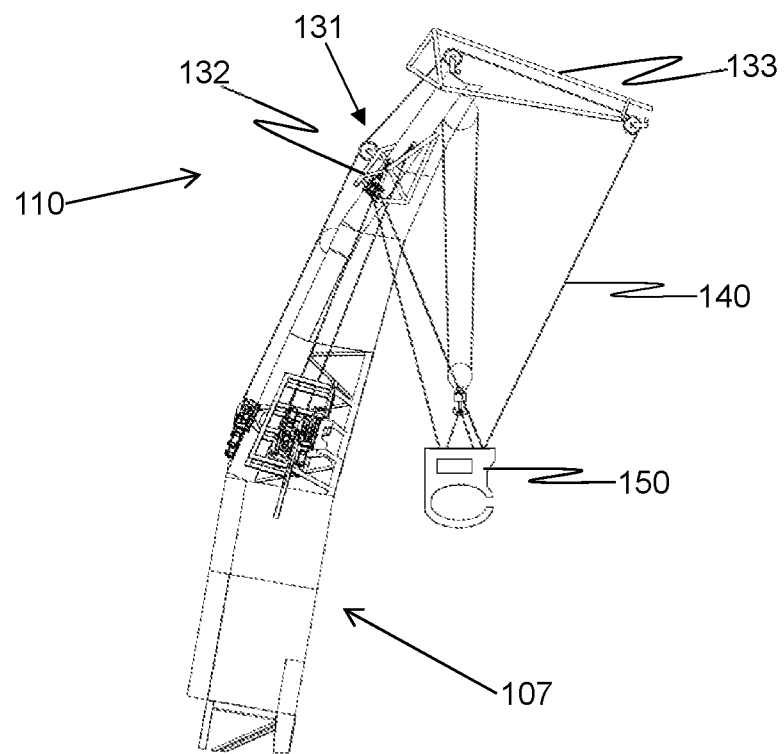
FIGS. 9A and 9B respectively show the hoisting arrangement of FIG. 8 in a side view and a front view.

FIG. 9A shows a side view of the hoisting arrangement 110 of FIG. 8. As visible in FIG. 9A, as an option, the third arm 133 may be oriented downwards, at an angle relative to horizontal in use.

Figure 9B:
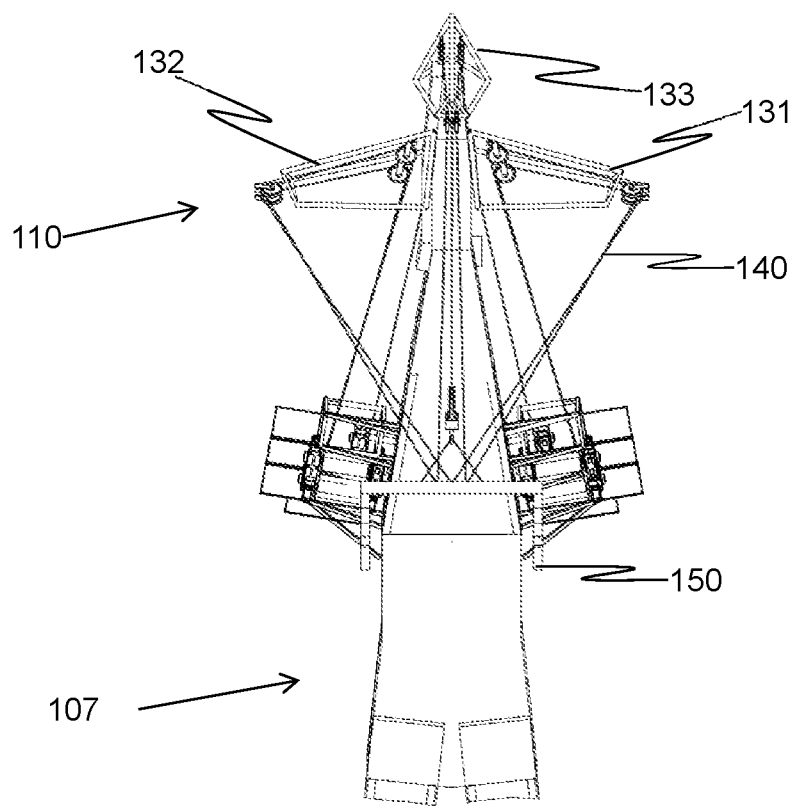

FIG. 9B shows a front view of the hoisting arrangement 110 of FIG. 8. As visible in FIG. 9B, the first arm 131 and the second arm 132 are oriented at an angle relative to the crane 107. Hence, for example, the first arm 131 and the second arm 132 may extend in a direction away from the third arm 133.

In the embodiments of the hoisting arrangement 110 of FIGS. 6-9B, as an option, the hoisting arrangement 150 is suspended from six cables, with an optional seventh auxiliary cable 164.

From the embodiments of FIGS. 6-9B, it will immediately become apparent that a vessel attachment module does not necessarily comprise a base to which the arms are connected. Hence, the vessel attachment module may comprise a plurality of arms with cable guide elements provided at distal ends of the arms. In other words, the base may be provided by the crane and/or the vessel.

Embodiments of hoisting arrangement may comprise a vision system, arranged to determine a position and/or one or more orientations of the hoisting arrangement 150 with respect to an arbitrary but static point on the tip of the boom. The vision system may comprise one or more cameras, Laser, LIDARs, SONORs, and/or reflectors and/or active or passive markers, or any other remote sensor and sensor/marker combination for determining a distance between a particular sensor of the vision system and a particular point on the hoisting arrangement 150.

The entire vision system may be provided on one of the arms, for example on the third arm 133. In other embodiment, different components of the vision system may be distributed over two or three of the first arm 131, second arm 132 and the third arm 133. For example, two or three of the arms may be provided with one or more sensors of the vision system. Alternatively, at least part of the vision system may be provided on the boom.

In particular embodiments, the vision system is arranged to determine a distance between sensors of the vision system and at least a number of specific points on the hoisting arrangement 150. Points on the hoisting arrangement 150 may be marked with a marking, which is arranged to reflect sensor signals sent by sensors of the vision system and/or is arranged to have a visually identifiable marker.

Additionally or alternatively, the vision system may be arranged to determine a position and/or orientation of the hoisting arrangement 150 relative to a fixed point. The fixed point may for example be on the vessel or on a monopile 104 or on a nacelle 106 or on any other element of a wind turbine.

The vision system may be used by a controller to control the length of at least one of the cables 140 from which the hoisting arrangement 150 is suspended, for example by controlling one or more winches. The controller may simultaneously use the vision system and one or more force sensors for controlling one or more of the winches.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

The invention claimed is:

1. A hoisting arrangement for hoisting a load, comprising:
   a gripper attachment arranged to be connected to the load, comprising a set of cable attachment points arranged as a first polygon;
   a vessel attachment module configured for attachment to a vessel, comprising a plurality of cable guide elements arranged as a second polygon;
   a plurality of cables spanned between the cable attachment points and the cable guide elements, and
   a control system for controlling a position and/or orientation of the gripper attachment within a work space by controlling a spanned length of at least two cables of the plurality of cables between the cable attachment points and the cable guide elements;
   wherein the vessel attachment module further comprises two lateral arms and a center arm arranged to be connected to a boom of a crane connected to the vessel, said crane including a crane base configured for interconnecting the boom and the vessel,
   said lateral arms project on opposite sides from a sagittal plane of the boom, such that first and second subsets of cable guide elements provided on said lateral arms are located within or rearwards relative to a sagittal cross-sectional periphery of the boom
   said center arm extends along the sagittal plane of the boom, such that a third subset of the cable guide elements provided on said center arm is located forwards relative to the sagittal cross-sectional periphery of the boom; and
   the center arm is at least partially oriented at an angle relative to a plane spanned by the lateral arms.

2. The hoisting arrangement according to claim 1, wherein the center arm and lateral arms jointly define a polyhedron with a non-zero volume.

3. The hoisting arrangement according to claim 1, wherein the two lateral arms are substantially equally sized arms and the center arm is sized differently from the two lateral arms.

4. The hoisting arrangement according to claim 1, further comprising the crane, the boom of the crane extending from the crane base.

5. The hoisting arrangement according to claim 4, wherein an offset between a distal end of the center arm and the crane base is different from an offset between a distal end of a first one of the lateral arms and the crane base.

6. The hoisting arrangement according to claim 5, wherein an offset between a distal end of a second one of the lateral arms and the crane base is substantially equal to the offset between the distal end of the first one of the lateral arms and the crane base.

7. The hoisting arrangement according to claim 5, wherein the center arm is connected at or near a distal end of the boom.

8. The hoisting arrangement according to claim 4, wherein said two lateral arms extend from the boom at positions that are remote from a distal end of the boom.

9. The hoisting arrangement according to claim 1, wherein the vessel attachment module comprises:
a base comprising a boom attachment module arranged to connect the base to a boom of a crane; and
a plurality of arms including the center arm and the two lateral arms extending from the base, wherein the arms are connected to the base at proximal ends of said arms; and
wherein the cable guide elements are provided at distal ends of the arms.

10. The hoisting arrangement according to claim 9, wherein the boom attachment module is provided within the pyramid defined by the respective distal ends of the center and lateral arms and the base.

11. The hoisting arrangement according to claim 1, wherein distal ends of the lateral arms, a distal end of the center arm, and the base jointly define a pyramid.

12. The hoisting arrangement according to claim 1, wherein the plurality of cables comprises a plurality of pairs of cables, and wherein each respective pair of cables is suspended from a respective distal end of a corresponding one of the center and lateral arms.

13. The hoisting arrangement according to claim 12, wherein the distal ends of the center arm, the lateral arms and the base define a pyramid, a first said cable of one said pair of cables is connected to a first said cable attachment point corresponding to a first vertex of the gripper attachment, and a second said cable of the pair of cables is connected to a second said cable attachment point of a second vertex of the gripper attachment.

14. The hoisting arrangement according to claim 1, wherein the center arm and the lateral arms are provided at a constant angular spacing.

15. The hoisting arrangement according to claim 1, wherein the two lateral arms each have distal ends and the two lateral arms are curved such that at said distal ends, the lateral arms are oriented perpendicular to the center arm.

16. The hoisting arrangement according to claim 1, configured for accommodating an auxiliary cable of the crane, which auxiliary cable is arranged to be suspended from the crane and to pass through the base.

17. The hoisting arrangement according to claim 1, wherein the control system comprises winches on which the cables can be wound and unwound, and a controller configured to control the winches for manipulating the position and/or orientation of the gripper attachment within the work space.

18. The hoisting arrangement according to claim 17, further comprising one or more force sensors arranged to provide a sensor signal related to a tension on one or more of the cables, wherein the control system is arranged to receive the sensor signals and to control the winches based on received sensor signals.

19. The hoisting arrangement according to claim 17, wherein the winches are provided in or on a base of the hoisting arrangement.

20. The hoisting arrangement according to claim 19, wherein the respective distal ends of the center arm and the lateral arms and the base jointly define a pyramid, and the winches are provided outside the pyramid defined by the distal ends of the center and lateral arms and the base.

21. A vessel arranged for hoisting an offshore wind turbine blade, comprising a hoisting arrangement according to claim 1, wherein the vessel attachment module is connected to the vessel.

22. The vessel according to claim 21, wherein the vessel attachment module comprises:
a base comprising a boom attachment module arranged to connect the base to a boom of a crane; and
a plurality of arms including the center arm and the two lateral arms extending from the base, wherein the plurality of arms are connected to the base at proximal ends of the arms; and
wherein the cable guide elements are provided at distal ends of the arms.

23. A hoisting arrangement for hoisting a load, comprising:
a gripper attachment arranged to be connected to the load, comprising a set of cable attachment points arranged as a first polygon;
a vessel attachment module configured for attachment to a vessel, comprising a plurality of cable guide elements arranged as a second polygon;
a plurality of cables spanned between the cable attachment points and the cable guide elements, and
a control system for controlling a position and/or orientation of the gripper attachment within a work space by controlling a spanned length of at least two cables of the plurality of cables between the cable attachment points and the cable guide elements;
wherein the vessel attachment module further comprises two lateral arms and a center arm arranged to be connected to a boom of a crane connected to the vessel, such that said lateral arms project on opposite sides from a sagittal plane of the boom, such that first and second subsets of cable guide elements on said lateral arms are located within or rearwards relative to a sagittal cross-sectional periphery of the boom;
said center arm extends along the sagittal plane of the boom, such that a third subset of the cable guide elements provided on said center arm is located forwards relative to the sagittal cross-sectional periphery of the boom; and
the two lateral arms are curved and have respective distal ends that are oriented perpendicular to the center arm.

* * * * *